US009140530B2

(12) United States Patent
Durivault et al.

(10) Patent No.: US 9,140,530 B2
(45) Date of Patent: Sep. 22, 2015

(54) METHOD AND DEVICE FOR INSPECTING A THREADING OF A TUBULAR CONNECTION USED IN THE OIL INDUSTRY

(75) Inventors: Jérôme Durivault, Paris (FR); Nigel Cross, Chessington (GB); Florian Peuchot, Toulouse (FR); Anthony Applincourt, Bettrechies (FR)

(73) Assignees: VALLOUREC OIL AND GAS FRANCE, Aulnoye-Aymeries (FR); NIPPON STEEL & SUMITOMO METAL CORPORATION, Tokyo (JP)

( * ) Notice: Subject to any disclaimer, the term of this patent is extended or adjusted under 35 U.S.C. 154(b) by 174 days.

(21) Appl. No.: 13/989,426

(22) PCT Filed: Nov. 15, 2011

(86) PCT No.: PCT/EP2011/005745
§ 371 (c)(1),
(2), (4) Date: Jun. 12, 2013

(87) PCT Pub. No.: WO2012/069154
PCT Pub. Date: May 31, 2012

(65) Prior Publication Data
US 2013/0247398 A1    Sep. 26, 2013

(30) Foreign Application Priority Data

Nov. 26, 2010  (FR) ...................................... 10 04615

(51) Int. Cl.
*G01B 3/48* (2006.01)
*G01B 3/40* (2006.01)
*G01B 5/00* (2006.01)

(52) U.S. Cl.
CPC .. *G01B 3/48* (2013.01); *G01B 3/40* (2013.01); *G01B 5/0002* (2013.01)

(58) Field of Classification Search
CPC ..................................... G01B 3/48; G01B 3/40
USPC ......................................................... 33/199 R
See application file for complete search history.

(56) References Cited

U.S. PATENT DOCUMENTS

| 1,846,502 | A |   | 2/1932 | Thomson |
| 2,200,181 | A | * | 5/1940 | Lamond ...................... 33/199 R |

(Continued)

FOREIGN PATENT DOCUMENTS

| CN | 1417553 A | 5/2003 |
| CN | 2769846 Y | 4/2006 |

(Continued)

OTHER PUBLICATIONS

International Search Report Issued Feb. 8, 2012 in PCT/EP11/05745 Filed Nov. 15, 2011.

*Primary Examiner* — Christopher Fulton
(74) *Attorney, Agent, or Firm* — Oblon, McClelland, Maier & Neustadt, L.L.P.

(57) ABSTRACT

A device, and a method of using the device, for inspecting a threading of a tubular component for exploration or working of hydrocarbon wells, the device including a threaded support that can cooperate by makeup with the threading of the tubular component, a mechanism blocking advance of the threaded support during makeup with the threading of the tubular component, a longitudinal rail fixed to the blocking mechanism and extending in a direction belonging to a plane passing through the axis of the threading of the treaded support, a mechanism inspecting treading of the tubular component, and a mechanism for longitudinal guidance to guide inspecting mechanism along the longitudinal rail.

17 Claims, 4 Drawing Sheets

(56) References Cited

U.S. PATENT DOCUMENTS

| | | | | |
|---|---|---|---|---|
| 3,983,633 A | * | 10/1976 | Kaifesh | 33/199 R |
| 4,184,265 A | * | 1/1980 | Horton | 33/199 R |
| 4,425,715 A | | 1/1984 | Willis et al. | |
| 4,536,964 A | * | 8/1985 | Lazes | 33/199 R |
| 4,672,750 A | * | 6/1987 | Storace et al. | 33/199 R |
| 4,947,555 A | * | 8/1990 | Allen, III | 33/199 R |
| 5,020,230 A | * | 6/1991 | Greenslade | 33/199 R |
| 5,182,862 A | * | 2/1993 | Frank et al. | 33/199 R |
| 5,276,971 A | * | 1/1994 | Brewster | 33/199 R |
| 6,502,041 B1 | | 12/2002 | Noel et al. | |
| 2011/0203125 A1 | | 8/2011 | Moreau et al. | |

FOREIGN PATENT DOCUMENTS

| | | |
|---|---|---|
| CN | 2938023 Y | 8/2007 |
| CN | 101126620 A | 2/2008 |
| CN | 201600113 U | 10/2010 |
| FR | 2 790 080 | 8/2000 |
| FR | 2 938 054 | 5/2010 |
| JP | H8-261705 | 10/1996 |

* cited by examiner

METHOD AND DEVICE FOR INSPECTING A THREADING OF A TUBULAR CONNECTION USED IN THE OIL INDUSTRY

The present invention relates to a device for inspecting a threading produced in the vicinity of one of the ends of a tubular component used in the exploration or working of hydrocarbon wells. The invention also relates to a method for inspecting such a threading.

Several inspection devices are known for inspecting the conformity of the threadings of tubular components used in the exploration or working of hydrocarbon wells. Because of the stresses exerted in service (whether during drilling operations or during working), it is desirable for the threaded zones to be machined to specifications and to be within tolerances. Such devices employ inspection means that can capture data relating to the geometry of the threadings. These means may be gauges which, by matching the form of the threading, can demonstrate the conformity (or non-conformity) of the width of the thread roots, the pitch, the taper of the threading, etc as a function of the reference value and the tolerances for that value. Those means may also be sensors that can produce a direct measurement of the width of the thread roots, the thread height, etc.

However, the Applicant has observed that it is often necessary to mark the region of the threading for carrying out the inspection and also to position the inspection means very accurately. In the case of axially tightening self-locking threadings as defined in documents U.S. Re 30 647 and U.S. Re 34 467, where the width of the thread roots reduces with distance from the face of the component, it is necessary to refer to the distance from the face of the threaded tubular component when carrying out a measurement of the thread roots. It will be recalled that the face of the tubular component is the distal or terminal surface of the tubular component. Similarly, when the width of the thread roots is to be measured in a conventional threading with a constant thread width, it is conventional to carry out the measurement at the thread mid-height. This therefore means that the inspection means have to be positioned in a stable, precise manner.

In general, known devices consist of set squares that produce a bearing point on the face of the threaded tubular component and one or two surface contact points for the threaded tubular component.

However, such devices cannot be mounted on the threaded tubular component in a stable manner and cannot be used to carry out measurements along an axis belonging to the median plane. In other words, such devices cannot be used to carry out a measurement with respect to the face of the threaded tubular component, it being certain that the segment measured between the face and the surface contact point of the threaded tubular component belongs to a plane passing through the axis of revolution of the threaded tubular component.

The Applicant has developed a stable inspection device that in particular can be used to carry out inspections of the threading at contact points the coordinates of which are identified in a precise manner in a three dimensional reference system.

The invention provides a device for inspecting a threading of a tubular component for the exploration or working of hydrocarbon wells, the device comprising a threaded support which can cooperate by makeup with the threading of the tubular component, means for blocking the advance of the threaded support during makeup with the threading of the tubular component, a longitudinal rail fixed to the threaded support and extending in a direction belonging to a plane passing through the axis of the threading of the threaded support, means for inspecting the threading of the tubular component, and means for longitudinal guidance in order to guide the means for inspecting the threading in translation along the longitudinal rail.

Optional characteristics, which are complementary or substitutional, will be defined below.

The means for blocking the advance of the threaded support during makeup with the threading of the tubular component may be an abutment fixed to the threaded support.

The means for blocking the advance of the threaded support during makeup with the threading of the tubular component may be comprised by the threading of the threaded support, the threading being of the axially tightening self-locking type.

The longitudinal rail may extend in a direction parallel to the axis of the threading of the threaded support.

The longitudinal rail may extend in a direction parallel to the taper of the threading of the threaded support.

The longitudinal guide means may comprise a guide bearing which can slide in the longitudinal rail.

The inspection device may further comprise radial guide means which can guide the threading inspection means in a direction perpendicular to and intersecting the axis of the threading of the threaded support.

The radial guide means may comprise a guide bearing which can slide in a radial rail fixed to the longitudinal guide means.

The radial guide means may comprise two parallel slats each fixed at one of their ends to the longitudinal guide means, the other end being fixed to the threading inspection means.

The inspection device may further comprise means for determining the position of the means for inspecting the threading of the tubular component along the longitudinal rail.

The means for determining the position of the threading inspection means may comprise a graduation provided on the longitudinal rail.

The means for determining the position of the threading inspection means may be formed by a potentiometer comprising a graduation fixed to the longitudinal rail in a parallel manner as well as a cursor which can slide along said graduation.

The material constituting the threaded support may be selected from the list constituted by bronze, or a hard polyamide type plastic, such that the surface of the threading of the support has high resistance to wear.

The means for inspecting the threading of the tubular component may comprise two arms, each provided with a first and a second end, the first ends being connected together by means of a deformable portion that allows an angular displacement between the second ends, the second ends each carrying a contact element, the inspection means further comprising means for determining the displacement.

The means for inspecting the threading of the tubular component may comprise a confocal sensor.

The invention also concerns a method for inspecting a threading of a tubular component for the exploration or working of hydrocarbon wells, in which:
  the threaded support of an inspection device in accordance with the invention is made up with the threading of the tubular component until the advance of makeup is blocked, the inspection device further being provided with radial guide means;
  the means for inspecting the threading of the tubular component are positioned at a selected position Po along the longitudinal rail, said inspection means comprising two arms each provided with a first and a second end, the first ends being connected together by means of a deformable portion that allows an angular displacement between the second ends, the second ends each carrying a contact element, the inspection means further comprising means for determining the displacement;

the inspection means are positioned such that one of the contact elements of the device is in contact with a loading flank of the threading while the other contact element is in contact with a stabbing flank of the threading, the two contact elements being within the same thread root;

the angular displacement e is measured;

the angular displacement measured previously, e, is compared with a reference value e-ref.

The invention also concerns another method for inspecting a threading of a tubular component for the exploration or working of hydrocarbon wells, in which:

the threaded support of an inspection device of the invention is made up with the threading of the tubular component until the advance of makeup is blocked, the inspection device further being provided with radial guide means and having a confocal sensor as the threading inspection means;

the confocal sensor is displaced along the longitudinal rail;

the data collected by the confocal sensor is processed in order to establish a profile of the threading.

Other advantages and characteristics of the invention will become apparent from the following detailed description of examples which are in no way limiting and from the accompanying drawings, which may not only serve to provide a better understanding of the invention, but also contribute to defining it where appropriate.

Figure 1:
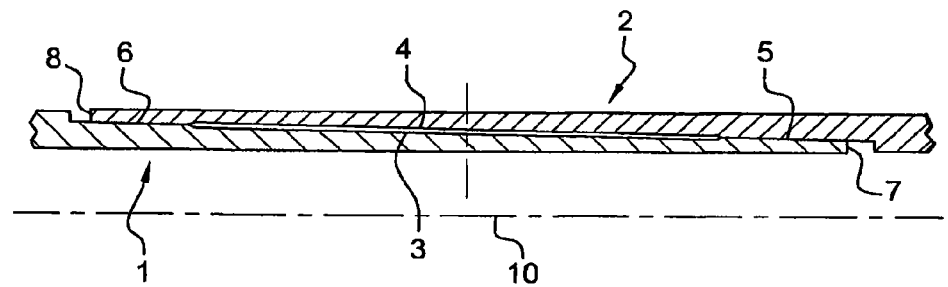
FIG. 1 shows a sectional view of a connection resulting from makeup of two threaded tubular components.

FIG. 1 shows a threaded connection between two substantially tubular components intended to be connected together by means of threadings and intended to be integrated into a working string of a hydrocarbon well. The connection, as is conventional, comprises a component provided with a male end 1 and a component provided with a female end 2, the male end 1 being capable of being connected to the female end 2. In this type of connection, the end 1 comprises a first and a second sealing surface that can respectively cooperate in an interference fit with a first and a corresponding second sealing surface of the female end 2, in order to form a first, 5, and a second, 6, sealing zone. The end 1 also comprises a male threaded zone 3 that can be made up into a corresponding threaded zone 4 of the female end 2, the threaded zones being provided between two sealing zones 5 and 6. The ends 1 and 2 each end in respective distal surfaces 7 and 8.

Figure 2:
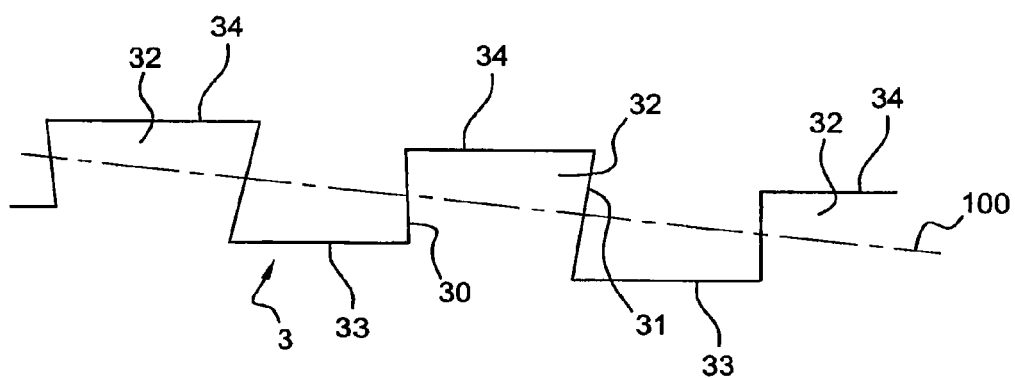
FIG. 2 shows a detail of a sectional view of a threading of a tubular component.

FIG. 2 shows details of the threaded zones 3 of a self-locking male threading. The complementary female threading is not shown in the figures. The term "self-locking" threadings means threadings comprising the features detailed below. The male threads, like the female threads, have a constant pitch. Their width decreases in the direction of their respective distal surfaces 7, 8 such that when making up, the male and female threads finish by locking into each other at a predetermined position.

More precisely, the pitch of the loading flanks of the female threading is constant, like the pitch of the stabbing flanks of the female threading. The pitch of the loading flanks is greater than the pitch of the stabbing flanks.

The pitch of the stabbing flanks 31 of the male threading 3 is constant, like the pitch of the loading flanks 30 of the male threading. The pitch of the stabbing flanks 31 is less than the pitch of the loading flanks 30.

Contact is principally made between the male and female loading flanks 30, as with the male and female stabbing flanks 31. In general, a clearance is provided between the crests of the male threads and the roots of the female threads, while the roots 33 of the male threads 32 and the crests of the female threads are in contact. The clearance means that grease can be evacuated during makeup, avoiding any risk of overpressure due to the grease.

The threading has a pitch $LFP_p$ of constant width between the loading flanks, and a pitch of constant width $SFP_p$ between the stabbing flanks, as well as increasing thread root widths from a value WIDTHmin to a value WIDTHmax in the direction of the distal surface 7 of the tubular component.

Advantageously, the male and female threads have a dovetail profile so that they are securely fitted into each other after makeup. This additional guarantee dispenses with risks of disengagement (also known as jump-out), which corresponds to the male and female threads coming apart when the connection is subjected to large bending, tensile or pressure loads. Advantageously, the threadings 1 and 2 have a tapered profile following a generatrix with a taper 100 in order to accelerate engagement of the male element into the female element.

In general, this taper generatrix forms an angle with the axis 10 in the range 1.5 degrees to 5 degrees. The taper generatrix in the present case is defined as passing through the centre of the loading flanks.

Figure 3:
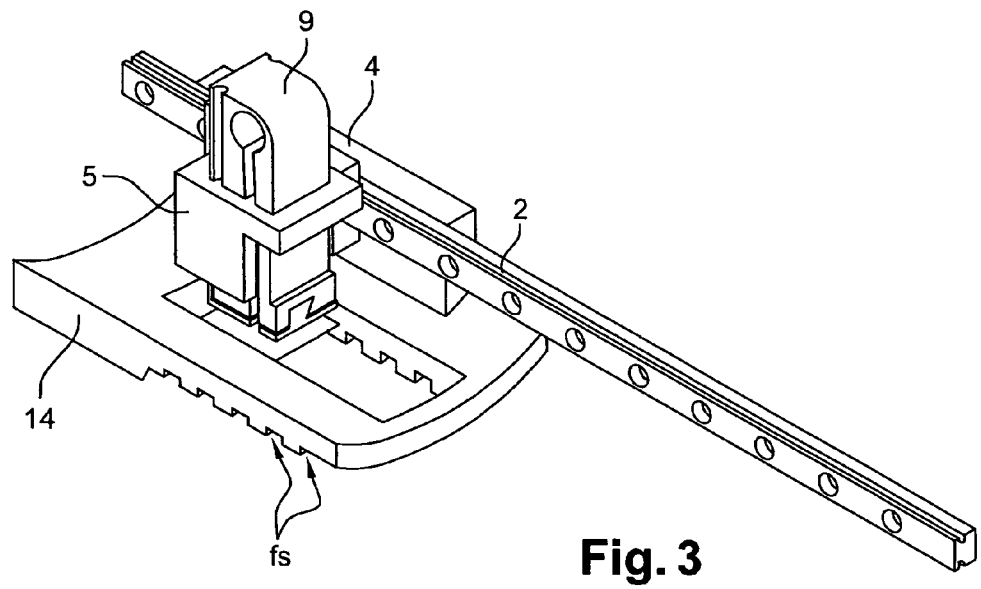
FIG. 3 shows a perspective view of an embodiment of the invention.
Figure 4:
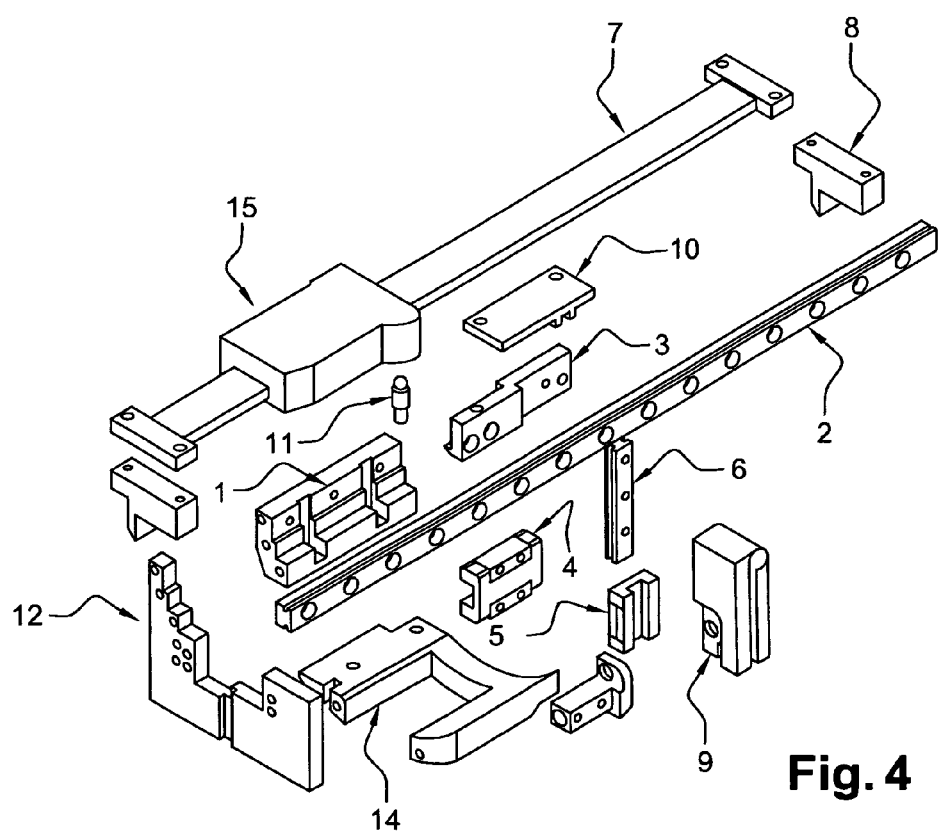
FIG. 4 is a representation of an embodiment of the invention in exploded view.

FIGS. 3 and 4 show a device for inspecting a threading of a tubular component for the exploration or working of hydrocarbon wells. The device comprises a threaded support 14 which can cooperate by makeup with the threading of the tubular component. This threaded support 14 is an envelope supported by a sector of the tapered portion. In other words, if a section of the support 14 is taken along a plane perpendicular to the axis of the tapered portion, an arc of a circle is obtained. This envelope is threaded either on its internal circumferential surface in the case in which the device is intended for the inspection of a male tubular component, or on its external circumferential surface in the case in which the device is for the inspection of a female tubular component. It should be noted that the threaded support 14 is preferably fixed to the device in a removable manner. In fact, it must be possible to change the threaded support 14 so that it can cooperate by makeup with the threading fc of the tubular component. Thus, the tapered portion which supports it must have the same taper as the component and have a diameter compatible therewith. Similarly, the threading of the support must be compatible with that of the tubular component. Preferably, the support extends circumferentially about an arc of a circle of less than a quarter of the circumference of the tubular component.

It also comprises means 9 for inspecting the threading of the tubular component. The threading inspection means 9 are fixed on the longitudinal guide means 4 which can guide said inspection means 9 in translation along a longitudinal rail 2.

The longitudinal rail 2 is fixed to the threaded support 14 and extends in a direction belonging to a plane passing through the axis of the threading of the threaded support 14.

In a first configuration, the longitudinal rail 2 extends in a direction which is parallel to the axis of the threading of the threaded support 14, said axis being coincident with that of the tubular component. Thus, when mounting the inspection device on the tubular component, the longitudinal rail is parallel to the axis of the threading of the tubular component. This configuration allows the distance of the inspection means 9 with respect to the face of the tubular component to be measured directly. In fact, this distance corresponds to the portion of the longitudinal rail separating the means 9 from the face (also termed the distal surface).

In a second configuration, the longitudinal rail 22 extends in a direction which is parallel to the taper of the threaded support 14, this direction also corresponding to the taper 100 of the tubular component. Thus, when mounting the inspection device on the tubular component, the longitudinal rail is parallel to the taper of the tubular component. This configuration means that the distance between the threading of the tubular component and the measurement means 9 can be kept constant.

It also comprises means 12 for blocking the advance of the threaded support 14 during makeup with the threading of the tubular component.

Figure 5:
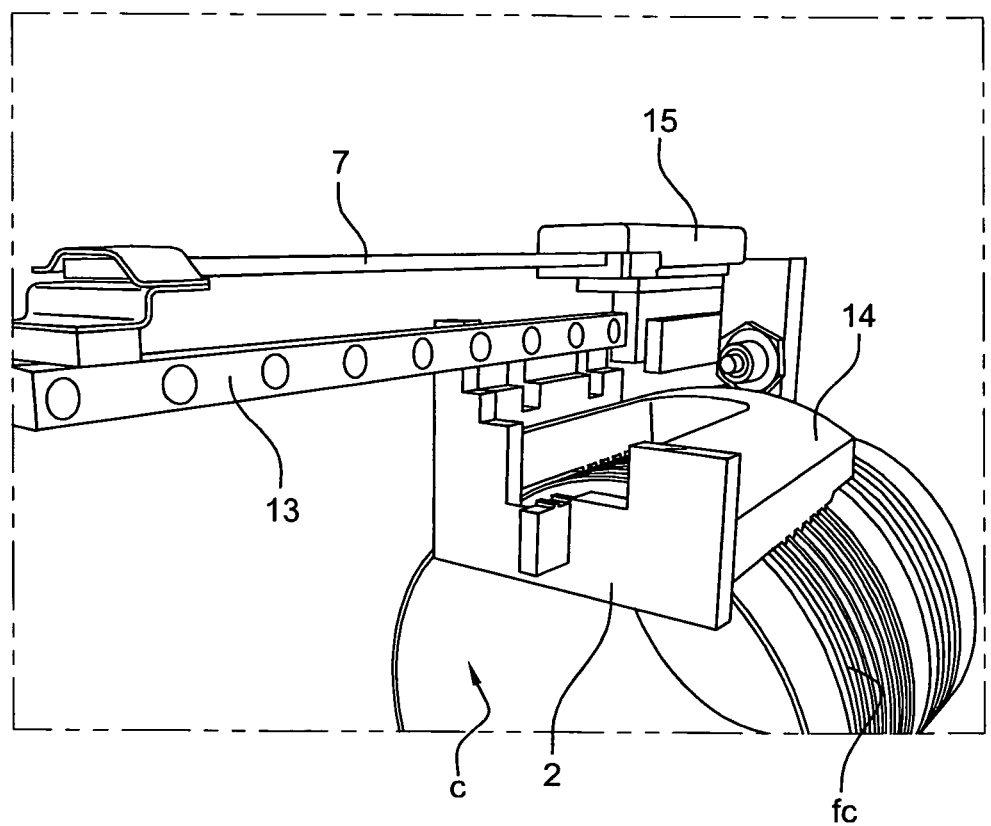
FIG. 5 is a representation of an embodiment of the invention.

In a first variation shown in FIGS. 3 and 4, the means for blocking the advance of the threaded support 14 during makeup with the threading of the tubular component are an abutment 12 fixed to the threaded support 14. As can be seen in FIG. 5, the abutment 12 comes to bear against the face of the tubular component (c) when the threading fs of the threaded support 14 has been made up sufficiently with the threading fc of said tubular component.

In a second variation, the means for blocking the advance of the threaded support 14 during makeup with the threading of the tubular component are constituted by the threading fs of the threaded support 14 which is of the axially tightening self-locking type, said threading fs cooperating in makeup with an equally axially tightening self-locking type threading of the tubular component.

Advantageously and as shown in FIGS. 3 and 4, the longitudinal guide means 4 are a guide bearing which can slide in the longitudinal rail 2.

Advantageously and as can be seen in FIGS. 3 and 4, the inspection device further comprises radial guide means 5. These latter allow the inspection means 9 to be moved in translation along an axis perpendicular to and intersecting the axis of the threading of the threaded support 14.

Advantageously and as can be seen in FIGS. 3 and 4, the radial guide means 5 are a guide bearing which can slide in a radial rail 6 which is fixed to the longitudinal guide means 4.

Advantageously, the radial guide means comprise two parallel slats each fixed at one of their ends to the longitudinal guide means, the other end being fixed to the threading inspection means. In this manner, it is sufficient to press on the means 9 for them to descend vertically without pivoting. The two slats remain parallel to each other and keep the means 9 vertical.

Advantageously and as can be seen in FIGS. 3 and 4, the inspection device further comprises means 7 for determining the position of the means 9 for inspecting the threading of the tubular component along the longitudinal rail 2.

Advantageously, the means for determining the position of the threading inspection means 9 are a graduation provided on the rail 2.

Advantageously and as can be seen in FIGS. 3 and 4, the means for determining the position of the threading inspection means 9 are formed by a potentiometer comprising a graduation 7 fixed to the rail 2 in a parallel manner, as well as a cursor 15 that can slide along said graduation. This embodiment means that the position of the threading inspection means 9 with respect to the face of the tubular component can readily be measured once the inspection device is mounted on the tubular component. The graduation 7 is in fact fixed with respect to the rail which is itself fixed with respect to the abutment 12, and so it is easy to read on the graduation of the graduation 7 a measurement corresponding to the distance of the means 9 with respect to the face of the tubular component, against which face the abutment 12 bears.

Clearly, other means employing sensors (optical, eddy current, laser etc) to mark the position of the inspection means 9 may be foreseen.

It is also possible to foresee the provision of a graduation on the radial guide means 5. It may be possible to graduate the radial rail 6 in order to determine the radial position of the inspection means 9 with respect to the longitudinal rail 2.

Advantageously, the material constituting the support 14 is selected from the list constituted by aluminium, bronze and polyamides, such that the surface of the threading of the support 14 has high resistance to wear, so that the tubular component is not damaged. For this reason, when mounting the threaded support 14 on the tubular component to be inspected, the blocking position is not falsified by the possibility that the threading of the support could be worn.

Figure 6:
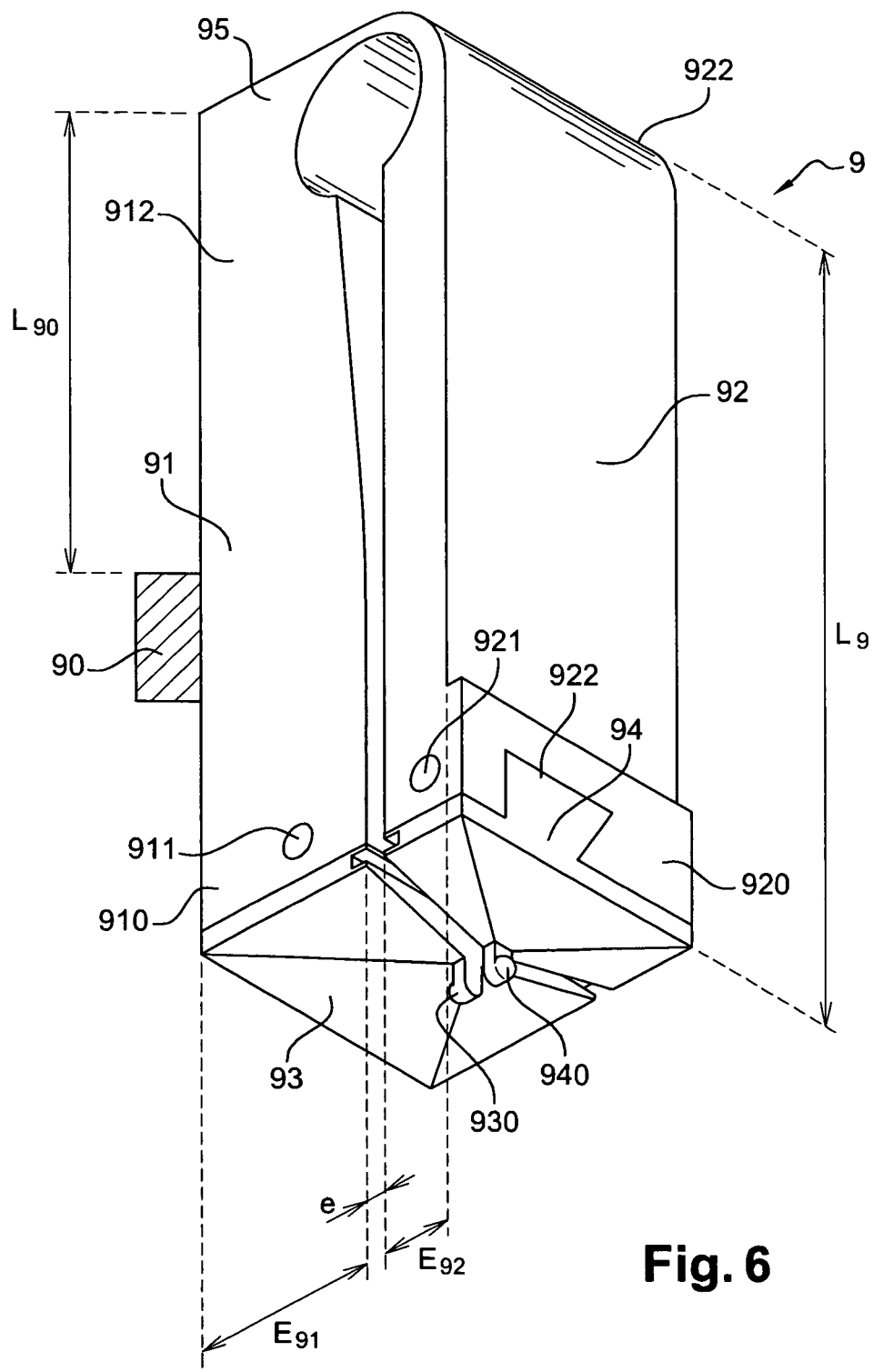
FIG. 6 represents a perspective view of a detail of the invention.

FIG. 6 shows the inspection means 9 which may be integrated into the inspection device described above. These means are in fact used to inspect the width of the threadings of tubular components.

The inspection device 9 comprises two arms 91, 92. The arm 91 is provided with a first, 912, and a second, 910, end, while the arm 92 is provided with a first, 922, and a second, 920, end. The first ends 912, 922 are termed "fixed" in that they are connected together via a deformable portion 95. The deformable portion 95 can be used to produce an angular displacement "e" due to pivoting of the second ends 910, 920 of the arms, termed mobile ends. In other words, the second ends 910, 920, termed the mobile ends, may mutually move apart or closer together along a circular arc trajectory which remains in the same plane. The second ends 910, 920, termed mobile, each carry a contact element 930, 940. The inspection means 9 also comprise means 90 for determining the angular displacement e.

Advantageously, the means 90 for determining the angular displacement e comprise a sensor. As an example, it may be possible to use a miniaturized inductive transceiver type contact sensor which corresponds to the size of the means 9, or a contactless sensor, such as a capacitative sensor, for example, or an eddy current sensor, or a sensor using optical technology (laser, confocal). These sensors are intended to measure the distance between the contact elements 930, 940. The maximum measurement range is thus equal to the displacement e. The sensor is selected according to criteria of accuracy, bulk, measurement range, and stability under service and environmental conditions. The accuracy criteria required correspond to an order of magnitude of 0.01% of the measurement range.

Advantageously, the arms 91, 92 and the deformable portion 95 are formed as a single piece. The deformable portion 95 is flexible, meaning that its flexing can produce the angular displacement e between the mobile ends 910, 920 of the arms. This is achieved by using a suitable material and dimensions.

In the present case, the arms and the deformable portion are formed from steel with a smaller thickness for the deformable portion than for the arms.

Advantageously, the deformable portion 95 is not only flexible but also elastic, so that the arms are in a reference position when at rest, i.e. when the inspection device is not in service.

The dimensions of the inspection means 9 in the case in which the deformable portion and the arms form a single steel piece, as a function of the height, h, of the threading and the width, WIDTH, of the roots of the threading, may be as follows:

- the diameter of the contact elements is in the range 0.5 h to 1.2 h;
- the displacement at rest is in the range 0.1 WIDTH to 0.6 WIDTH;
- the length of the contact elements is in the range 1 mm to 2 h;
- the ratio of the arm thicknesses is greater than 2;
- this difference in thickness principally restricting the movement to a single arm. Thus, the arm which remains fixed acts as a reference and it is easier to measure the displacement e of the other arm, which is in mobile.
- the thickness of the deformable portion is in the range 0.005 to 0.5 times the thickness of the thinnest arm;
- the reduction in thickness of the deformable portion with respect to the thickness of the arms, and in particular with respect to the thickness of the thinnest arm, provides the deformable portion with the flexibility desired to produce the displacement e of the arms with respect to each other.

Other threading inspection means 9 may be mounted on the device. This is the case, for example, with gauges which comprise threading portions which are to specification and which are used to validate whether the threading of the tubular component to be inspected is indeed complementary to that of the gauge.

It is possible, for example, to use a confocal sensor using chromatic confocal imaging such as the optoNCDT 2401 from Micro Epsilon. This type of sensor allows the profile of a threading to be determined by scanning said threading over a given distance. Depending on the complexity of the profile, it may be necessary to scan said profile several times, changing the angle of the sensor. Chromatic confocal imaging is recognized as a precise and reliable technique for measuring thickness and distance. It forms part of the 3D metrological techniques recommended in International Standard ISO 25178. The measurement principle employs a chromatic objective projecting the image of a point source of white light W as a continuum of monochromatic images located on the optical axis (chromatic coding). The surface of a specimen placed in this chromatic coding zone will diffuse the incident beam of light. The light diffuses back through the chromatic objective L in the reverse direction and arrives at an opening P which filters out all of the wavelengths apart from one, $\lambda M$. The light collected is analyzed by a spectrograph S. The position of the specimen is directly related to the detected wavelength $\lambda M$. The advantages are as follows: high resolution, high signal to noise ratio, functions with all types of materials, wide choice of measurement range, compatible with local large inclinations, coaxial geometry (no shadowing), and no speckle effect.

The invention also concerns an inspection method employing the inspection means described in FIG. 6 and defined in the following steps:

- the threaded support 14 of an inspection device further provided with radial guide means 5 is made up with the threading fc of the tubular component until the advance of makeup is blocked;
- the inspection means 9 described above are positioned at a selected position Po along the longitudinal rail 2;
- the inspection means 9 are positioned such that one of the contact elements of the device 930, 940 is in contact with a loading flank of the threading while the other contact element 940, 930 is in contact with a stabbing flank of the threading, the two contact elements being within the same thread root;
- the angular displacement e is measured;
- the angular displacement measured previously, e, is compared with a reference value e-ref.

The invention also concerns another inspection method using a confocal sensor and defined in the following steps:

- the threaded support 14 of an inspection device in accordance with the invention is made up with the threading fc of a tubular component until the advance of makeup is blocked;
- the confocal sensor is displaced along the longitudinal rail 2;
- the data collected by the confocal sensor are processed in order to establish a profile of the threading fc.

The inspection device has the double advantage of positioning the threading inspection means 9 both longitudinally and radially in a precise and reliable manner.

The cooperation between the threaded support 14 and the abutment 12 ensures reliable mounting of the inspection device on the tubular component to be inspected, meaning that it might be difficult to move the inspection device once it is in position.

Next, the longitudinal rail 2 constitutes a guide allowing the inspection means 9 to be displaced precisely along an axis parallel to the axis of the threaded support, said axis also being the axis of revolution of the tubular component. It is thus possible to inspect the threading of a tubular component at a precise longitudinal position. The inspection device provided with means 9 for measuring the thread width described in FIG. 6 is applicable in the case of self-locking threadings. This type of threading, where the width of the thread roots varies throughout the length of the threading, necessitates measuring the width of the thread roots at a predetermined distance from the face of the tubular component.

Finally, the radial guide means 5 mean that the inspection means 9 can be displaced precisely in a radial direction with respect to the axis of the threaded support, said axis also being the axis of revolution of the tubular component. Thus, it is possible to inspect the threading of the tubular component at a precise radial position. This is of advantage in the case of self-locking threadings with a dovetail shaped flank profile, and also in the case of threadings with a trapezoidal profile, since the thread flanks are not perpendicular to the axis of rotation of the tubular component. The width of the thread roots varies depending on whether the measurement is carried out at the root, at mid-height or at the thread crest; it is usual to refer to a measurement carried out at mid-height.

The invention claimed is:

1. A device for inspecting a threading of a tubular component for exploration or working of hydrocarbon wells, the device comprising:
   a threaded support that can cooperate by makeup with the threading of the tubular component;
   means for blocking advance of the threaded support during makeup with the threading of the tubular component;

a longitudinal rail fixed to the means for blocking the advance of the threaded support and extending in a direction belonging to a plane passing through the axis of the threading of the threaded support;

means for inspecting the threading of the tubular component; and means for longitudinal guidance to guide the means for inspecting the threading in translation along the longitudinal rail, wherein the means for inspecting the threading of the tubular component comprises two arms, each including a first and a second end, the first ends being connected together by a deformable portion that allows an angular displacement between the second ends, the second ends each carrying a contact element, the inspection means further comprising means for determining the displacement.

2. An inspection device according to claim 1, wherein the means for blocking the advance of the threaded support during makeup with the threading of the tubular component comprise an abutment fixed to the threaded support.

3. An inspection device according to claim 1, wherein the means for blocking the advance of the threaded support during makeup with the threading of the tubular component comprises a threading of the threaded support, the threading being of axially tightening self-locking type.

4. An inspection device according to claim 1, wherein the longitudinal rail extends in a direction parallel to the axis of the threading of the threaded support.

5. An inspection device according to claim 1, wherein the longitudinal rail extends in a direction parallel to a taper of the threading of the threaded support.

6. An inspection device according to claim 1, wherein the longitudinal guide means comprises a guide bearing that can slide in the longitudinal rail.

7. An inspection device according to claim 1, further comprising radial guide means that can guide the threading inspection means in a direction perpendicular to and intersecting the axis of the threading of the threaded support.

8. An inspection device according to claim 7, wherein the radial guide means comprises a guide bearing that can slide in a radial rail fixed to the longitudinal guide means.

9. An inspection device according to claim 7, wherein the radial guide means comprises two parallel slats each fixed at first of their ends to the longitudinal guide means, a second end being fixed to the means for inspecting.

10. An inspection device according to claim 1, further comprising means for determining a position of the means for inspecting the threading of the tubular component along the longitudinal rail.

11. An inspection device according to claim 10, wherein the means for determining the position of the means for inspecting the threading comprises a graduation provided on the longitudinal rail.

12. An inspection device according to claim 10, wherein the means for determining the position of the means for inspecting the threading includes a potentiometer comprising a graduation fixed to the longitudinal rail in a parallel manner and a cursor that can slide along the graduation.

13. An inspection device according to claim 1, wherein a material constituting the support is selected from aluminium, bronze and polyamides, such that a surface of the threading of the support has high resistance to wear.

14. An inspection device according to claim 1, wherein the means for inspecting the threading of the tubular component comprises a confocal sensor.

15. A method for inspecting a threading of a tubular component for exploration or working of hydrocarbon wells, comprising:

threading the threaded support of an inspection device in accordance with claim 1, with the threading of the tubular component until progression of threading is blocked;

positioning the inspection means at a selected position along the longitudinal rail;

positioning the inspection means such that one of the contact elements of the device is in contact with a loading flank of the threading while the other contact element is in contact with a stabbing flank of the threading, the two contact elements being within the same thread root;

measuring the angular displacement; and comparing the angular displacement measured previously with a reference value.

16. A method for inspecting a threading of a tubular component for the exploration or working of hydrocarbon wells, comprising:

making up the threaded support of an inspection device in accordance with claim 1 with the threading of the tubular component until progression of threading is blocked;

displacing the inspection means along the longitudinal rail; and processing the data collected by the confocal sensor to establish a profile of the threading.

17. A device for inspecting a threading of a tubular component for exploration or working of hydrocarbon wells, the device comprising:

a threaded support that can cooperate by makeup with the threading of the tubular component;

means for blocking advance of the threaded support during makeup with the threading of the tubular component;

a longitudinal rail fixed to the means for blocking the advance of the threaded support and extending in a direction belonging to a plane passing through the axis of the threading of the threaded support;

means for inspecting the threading of the tubular component;

means for longitudinal guidance to guide the means for inspecting the threading in translation along the longitudinal rail;

radial guide means that can guide the threading inspection means in a direction perpendicular to and intersecting the axis of the threading of the threaded support; and wherein the radial guide means comprises two parallel slats each fixed at first of their ends to the longitudinal guide means, a second end being fixed to the means for inspecting.

* * * * *